(12) United States Patent
Erickson et al.

(10) Patent No.: US 9,446,502 B2
(45) Date of Patent: Sep. 20, 2016

(54) SHAPED, FRACTURED ABRASIVE PARTICLE, ABRASIVE ARTICLE USING SAME AND METHOD OF MAKING

(75) Inventors: Dwight D. Erickson, Oakdale, MN (US); Scott R. Culler, Burnsville, MN (US); Negus B. Adefris, Woodbury, MN (US); John T. Boden, White Bear Lake, MN (US); John D. Haas, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 767 days.

(21) Appl. No.: 13/227,924

(22) Filed: Sep. 8, 2011

(65) Prior Publication Data

US 2011/0314746 A1     Dec. 29, 2011

Related U.S. Application Data

(62) Division of application No. 12/336,877, filed on Dec. 17, 2008, now Pat. No. 8,034,137.

(60) Provisional application No. 61/016,965, filed on Dec. 27, 2007.

(51) Int. Cl.
*C09K 3/14* (2006.01)
*B24D 3/00* (2006.01)
*B01J 2/22* (2006.01)

(52) U.S. Cl.
CPC .. *B24D 3/00* (2013.01); *B01J 2/22* (2013.01); *C09K 3/1409* (2013.01); *Y10T 428/24364* (2015.01); *Y10T 428/24413* (2015.01); *Y10T 428/2982* (2015.01)

(58) Field of Classification Search
CPC .................................. C09K 3/14; B24D 3/00
USPC ........................... 51/293, 307, 309; 501/127
See application file for complete search history.

(56) References Cited

U.S. PATENT DOCUMENTS

| 3,481,723 A | 12/1969 | Kistler |
| 5,584,896 A | 12/1996 | Broberg |
| 5,593,467 A | 1/1997 | Monroe |
| 5,641,330 A * | 6/1997 | Celikkaya et al. ............. 51/309 |

(Continued)

FOREIGN PATENT DOCUMENTS

EP     0 656 319     6/1995

OTHER PUBLICATIONS

Notice of Allowance dated Oct. 28, 2011 in U.S. Appl. No. 12/337,001.

*Primary Examiner* — Pegah Parvini
(74) *Attorney, Agent, or Firm* — Scott A. Baum; David B. Patchett

(57) ABSTRACT

Precursor alpha alumina abrasive particles in a mold are subjected to a drying process that cracks or fractures at least a majority of the precursor abrasive particles into at least two pieces thereby producing abrasive shards having a smaller size than the mold cavity from which they were made. The smaller abrasive shards, once formed, could be reassembled like jigsaw puzzle pieces to reproduce the original cavity shape of the mold from which they were made. The cracking or fracturing of the precursor abrasive particles is believed to occur by ensuring that the surface tension of the abrasive dispersion to the walls of the mold is greater than the internal attractive forces of the abrasive dispersion as the abrasive dispersion is dried within the mold cavity.

18 Claims, 4 Drawing Sheets

(56) References Cited

U.S. PATENT DOCUMENTS

| | | | |
|---|---|---|---|
| 5,984,988 A * | 11/1999 | Berg et al. | 51/293 |
| 7,524,345 B2 | 4/2009 | Nevoret | |
| 7,867,302 B2 | 1/2011 | Nevoret | |
| 7,875,091 B2 | 1/2011 | Nevorct | |
| 2007/0084133 A1 * | 4/2007 | Schwabel et al. | 51/307 |

* cited by examiner

SHAPED, FRACTURED ABRASIVE PARTICLE, ABRASIVE ARTICLE USING SAME AND METHOD OF MAKING

CROSS REFERENCE TO RELATED APPLICATIONS

This application is a divisional of U.S. application Ser. No. 12/336,877, filed Dec. 17, 2008, now U.S. Pat. No. 8,034,137 now allowed, which claims the benefit of U.S. Provisional Application No. 61/016,965 entitled Shaped, Fractured Abrasive Particle, Abrasive Article Using Same And Method Of Making filed on Dec. 27, 2007 and herein incorporated by reference in their entirety.

BACKGROUND

Abrasive particles and abrasive articles made from the abrasive particles are useful for abrading, finishing, or grinding a wide variety of materials and surfaces in the manufacturing of goods. As such, there continues to be a need for improving the cost, performance, or life of the abrasive particle and/or the abrasive article.

Triangular shaped abrasive particles and abrasive articles using the triangular shaped abrasive particles are disclosed in U.S. Pat. No. 5,201,916 to Berg; U.S. Pat. No. 5,366,523 to Rowenhorst; and U.S. Pat. No. 5,984,988 to Berg. In one embodiment, the abrasive particles' shape comprised an equilateral triangle. Triangular shaped abrasive particles are useful in manufacturing abrasive articles having enhanced cut rates.

SUMMARY

Shaped abrasive particles, in general, can have superior performance over randomly crushed abrasive particles. By controlling the shape of the abrasive particle it is possible to control the resulting performance of the abrasive article. However, as the size of the shaped abrasive particle is decreased it becomes more difficult to manufacture the shaped abrasive particle. Molds having extremely small cavities are difficult to fill with the abrasive dispersion and the resulting precursor abrasive particles are difficult to remove from the mold. While it is possible to crush the shaped abrasive particles to smaller particle sizes, such a process produces a large distribution in the resulting particle sizes. Often, many of the abrasive particles will be too small (fines) and are not utilized resulting in waste and increasing the manufacturing cost. Therefore, what is needed is a method for producing smaller shaped abrasive particles that does not utilize crushing and that produces a smaller distribution in the resulting particle sizes.

The inventors have discovered that by drying precursor abrasive particles in a mold in such a manner as to initiate fracturing of a majority of the precursor abrasive particles, smaller abrasive particles can be made from a mold having much larger cavities. Because the process utilizes cracking or fracturing to form smaller precursor abrasive particles in the mold, significantly fewer fines are generated resulting in less waste. Additionally, the fractured surfaces of the resulting abrasive particles can enhance the sharpness and cutting ability of the abrasive particles.

The precursor abrasive particles in the mold are subjected to a drying process that cracks or fractures at least a majority of the precursor abrasive particles into at least two pieces thereby producing abrasive shards having a smaller size than the mold cavity from which they were made. The smaller abrasive shards, once formed, could be reassembled like jigsaw puzzle pieces to reproduce the original cavity shape of the mold from which they were made. The cracking or fracturing of the precursor abrasive particles is believed to occur by ensuring that the surface tension of the abrasive dispersion to the walls of the mold is greater than the internal attractive forces of the abrasive dispersion as the abrasive dispersion is dried within the mold cavity.

Hence, in one embodiment, the disclosure resides in an abrasive comprising a plurality of alpha alumina abrasive shards having an abrasives industry specified nominal grade. The plurality of alpha alumina abrasive shards comprise a first precisely formed surface, a second precisely formed surface intersecting with the first precisely formed surface at a predetermined angle α, a third surface opposite the first precisely formed surface, and a fractured surface.

In another embodiment, the disclosure resides in a method comprising: Providing a mold having a plurality of cavities. Filling the plurality of cavities with an abrasive dispersion, the abrasive dispersion comprises particles in a liquid that can be converted into alpha alumina, and the liquid comprising a volatile component. Removing at least a portion of the volatile component from the abrasive dispersion, while the abrasive dispersion resides in the plurality of cavities, thereby forming a plurality of precursor abrasive particles having a predetermined size. Fracturing at least a majority of the plurality of precursor abrasive particles into at least two pieces while the plurality of precursor abrasive particles reside within the plurality of cavities thereby forming a fractured plurality of precursor abrasive particles.

BRIEF DESCRIPTION OF THE DRAWING

It is to be understood by one of ordinary skill in the art that the present discussion is a description of exemplary embodiments only, and is not intended as limiting the broader aspects of the present disclosure, which broader aspects are embodied in the exemplary construction.

Figure 1:
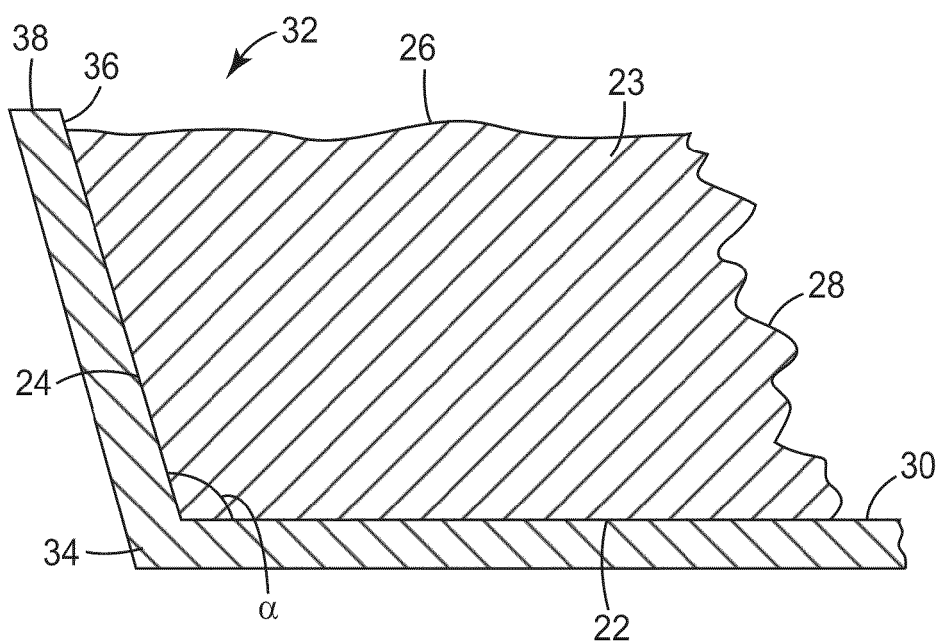
FIG. 1 illustrates a cross section of one embodiment of a precursor abrasive particle in a mold cavity.

Repeated use of reference characters in the specification and drawings is intended to represent the same or analogous features or elements of the disclosure.

DEFINITIONS

As used herein, forms of the words "comprise", "have", and "include" are legally equivalent and open-ended. Therefore, additional non-recited elements, functions, steps or limitations may be present in addition to the recited elements, functions, steps, or limitations.

As used herein, the term "abrasive dispersion" means a composition containing particles that can be converted into alpha alumina that is introduced into the mold cavity. The composition is referred to as an abrasive dispersion until sufficient volatile components are removed to bring solidification of the abrasive dispersion.

As used herein, the term "precursor abrasive particle" means the unsintered particle produced by removing a sufficient amount of the volatile component from the abrasive dispersion, when it is in the mold cavity, to form a solidified body that can be removed from the mold cavity and substantially retain its molded shape in subsequent processing operations.

As used herein, the term "precisely formed surface" means a surface that is created by at least partially drying, dewatering, or curing an abrasive dispersion while residing in a cavity in a mold.

As used herein, the term "abrasive shard" means the sintered alpha alumina abrasive particle produced by the process of this disclosure.

DETAILED DESCRIPTION

Abrasive Shards

Figure 4:
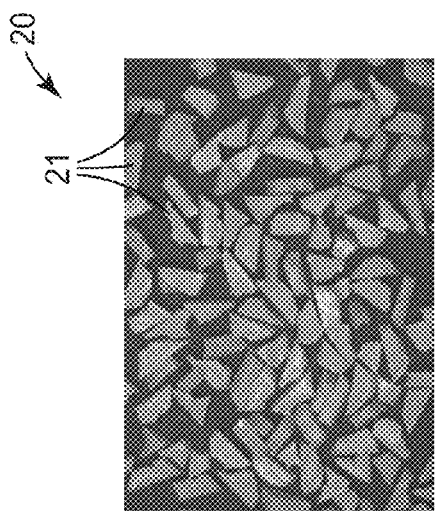
FIG. 4 illustrates smaller, fractured abrasive shards resulting from the right-hand side of the mold in FIG. 2.
Figure 5:
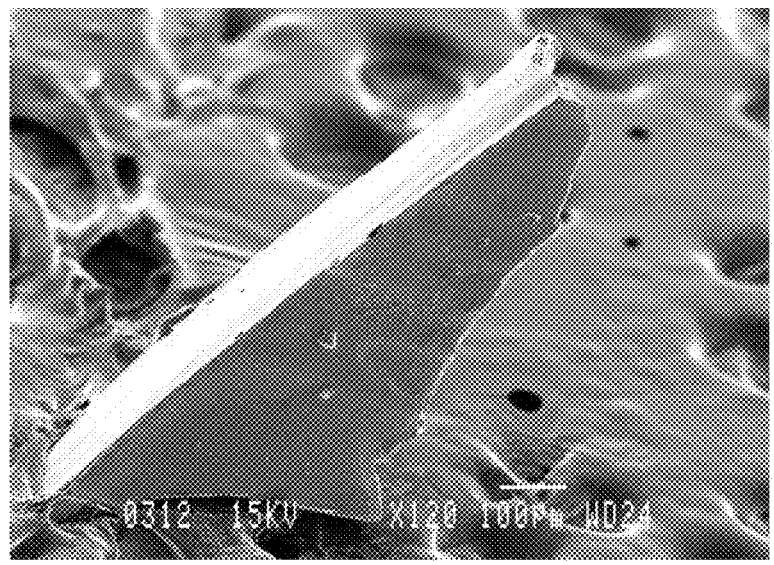
FIG. 5 illustrates a scanning electron microscopic photo of a representative abrasive shard similar to the abrasive shards shown in FIG. 4.

Referring to FIGS. 4 and 5 abrasive particles 20 are illustrated. The abrasive particles 20 comprise fractured alpha alumina abrasive particles formed into a plurality of alpha alumina abrasive shards 21. Referring to FIG. 1, a precursor abrasive particle 23 in a mold 34 is illustrated. Each of the alpha alumina abrasive shards 21 comprises at least a first precisely formed surface 22, a second precisely formed surface 24 intersecting with the first precisely formed surface at a predetermined angle α, a third surface 26 opposite the first precisely formed surface 22, and a fractured surface 28. The first precisely formed surface 22 can be formed by contact with a bottom surface 30 of a cavity 32 in the mold 34. In FIG. 1, only a portion of the cavity 32 in the mold 34 is indicated in cross section. Typically, the mold 34 has a plurality of cavities to economically produce the alpha alumina abrasive shards 21. The first precisely formed surface 22 substantially replicates the surface finish and shape of the bottom surface 30 of the cavity 32.

The second precisely formed surface 24 of the abrasive shard 21 can be formed by contact with a sidewall 36 of the cavity 32 in the mold 34. The sidewall 36 is designed to intersect the bottom surface 30 at a predetermined angle α. The second precisely formed surface 24 substantially replicates the surface finish and shape of the sidewall 36 of the cavity 32. The second precisely formed surface 24 is molded by contact with the sidewall 36 of the cavity 32. As such, at least two surfaces of the resulting abrasive shard are precisely formed (22, 24) and the angle of intersection α between the two surfaces is a pre-determined angle based on the selected mold geometry.

The third surface 26 of the abrasive shard 21 opposite the first precisely formed surface 22 can be randomly wavy or undulating in appearance since it is in contact with the air after the cavity 32 is filled with an abrasive dispersion. The third surface 26 is not precisely formed since it is not molded by contact with the cavity 32. Often, the third surface 26 is created by scraping or doctoring a top surface 38 of the mold 34 to remove excessive abrasive dispersion from the mold. The doctoring or scraping step results in a subtle waviness or irregularity of the third surface 26 that is visible under magnification. As such, the third surface 26 is similar to a surface created by extrusion, which is also not precisely formed. In the extrusion process, the sol-gel is forced out of a die. As such, the surfaces of the sol-gel exhibits scrape marks, gouges, and/or score lines as a result of the extrusion process. Such marks are created by the relative motion between the sol-gel and the die. Additionally, extruded surfaces from a die can be generally a smooth plane. In contrast, the precisely formed surfaces can replicate a sinusoidal or other more complex geometrical surface having significant variations in height along the length of the surface.

The fractured surface 28 of the abrasive shard 21 generally propagates between the first precisely formed surface 22 and the opposing third surface 26 and between opposing sidewalls of the cavity 32 when the cavity depth is relatively small compared to the area of the bottom surface 30. The fractured surface 28 is characterized by sharp, jagged points typical of a brittle fracture. The fractured surface 28 can be created by a drying process that cracks or fractures at least the majority of the shaped abrasive particle precursors into at least two pieces while residing in the cavity 32. This produces abrasive shards 21 having a smaller size than the mold cavity 32 from which they were made. The abrasive shards, once formed, could be reassembled like jigsaw puzzle pieces to reproduce the original cavity shape of the mold from which they were made. The cracking or fracturing of the precursor abrasive particles is believed to occur by ensuring that the surface tension of the abrasive dispersion to the walls of the cavity 32 is greater than the internal attractive forces of the abrasive dispersion as the abrasive dispersion is dried in the cavity.

Referring to FIG. 5, for the abrasive shard 21 illustrated, the fractured surface 28 is present along the right-hand side of the abrasive shard. The second precisely formed surface 24 is present along the left-hand, angled surface of the abrasive shard 21. The third surface 26 is facing frontward and has some irregularity and waviness from the scraping operation. The first precisely formed surface 22 is hidden from view facing rearward. The abrasive shard in FIG. 5 was produced in a triangular mold cavity. One of the triangle's corners is present at the lower, left portion of the abrasive shard.

Figure 2:
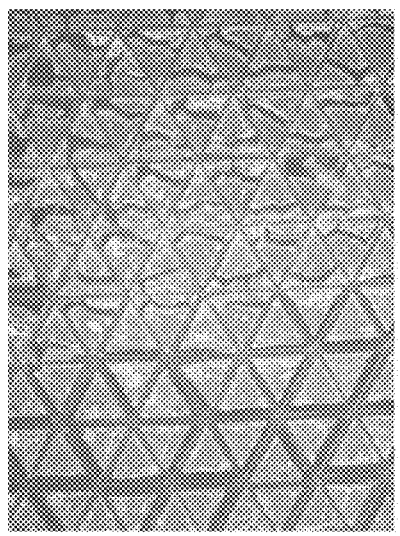
FIG. 2 illustrates a top view of a mold having a plurality of cavities containing precursor abrasive particles.
Figure 3:
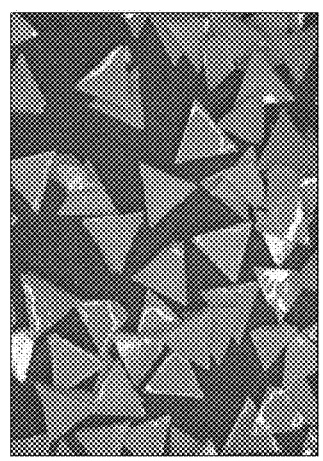
FIG. 3 illustrates larger, intact abrasive particles resulting from the left-hand side of the mold in FIG. 2.

Referring to FIG. 2, the fracturing process produces a discrete number of fractured, precursor abrasive particles in each mold cavity. In general, about 2 to 4 fractured precursor abrasive particles are produced within each cavity 32. As such, the inventive process produces few extremely small particles (fines) resulting in less waste than if a crushing operation was used to reduce the intact triangular particle's size as shown in FIG. 3. Because of the fracturing process, each of the abrasive shards retains a portion of its original molded shape unlike a crushing operation that could produce abrasive particles without any precisely formed surfaces remaining. As such, the size distribution of the fractured precursor abrasive particles is relatively small and more uniform than crushed particles. The ultimate number of fractured precursor abrasive particles produced within each cavity can vary depending on the cavity size and shape, the drying rate, and temperature used to fracture the precursor abrasive particles within the mold. In various embodiments of the disclosure, less than or equal to about 10, 9, 8, 7, 6, 5, 4, 3, or 2 fractured precursor abrasive particles are produced within each mold cavity.

Since the precursor abrasive particles are processed in such a manner as to intentionally fracture them, at least the majority (greater than 50 percent) of the precursor abrasive particles are fractured into at least two pieces within the mold's cavity 32 as the precursor abrasive particles are dried. In various embodiment of the disclosure, about 75 percent to 100 percent, or about 90 to 100 percent, or about 98 to 100 percent of the precursor abrasive particles are fractured into at least two pieces while residing in the cavities in the mold.

Because the precursor abrasive particles are intentionally fractured while residing in the mold, they retain at least a portion of the original molded shape's sidewall and bottom. This feature can provide abrasive shards that are sharper than crushed particles, which have much more rounded and blocky shapes. The fractured precursor abrasive particles can have a high aspect ratio and very sharp edges where the fractured surface 28 meets with the precisely formed surfaces. As such, the alpha alumina abrasive shards have excellent performance when used to make an abrasive article.

The fractured, precursor abrasive particles are calcined and sintered to form the alpha alumina abrasive shards. The alpha alumina abrasive shards may be manufactured in a wide range of particle sizes depending on the size of the molded cavity and the number of fractured pieces created by the fracturing step of the process. Typically the alpha alumina abrasive shards range in size from 0.1 to 5000 micrometers, 1 to 2000 micrometers, 5 to 1500 micrometers, or even in some embodiments, from 50 to 1000, or even from 100 to 1000 micrometers.

Alpha alumina abrasive shards made according to the present disclosure can be incorporated into an abrasive article, or used in loose form. Abrasive particles are generally graded to a given particle size distribution before use. Such distributions typically have a range of particle sizes, from coarse particles to fine particles. In the abrasive art this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards.

ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, the alpha alumina abrasive shards can graded to a nominal screened grade using U.S.A. Standard Test Sieves conforming to ASTM E-11 "Standard Specification for Wire Cloth and Sieves for Testing Purposes." ASTM E-11 proscribes the requirements for the design and construction of testing sieves using a medium of woven wire cloth mounted in a frame for the classification of materials according to a designated particle size. A typical designation may be represented as −18+20 meaning that the alpha alumina abrasive shards pass through a test sieve meeting ASTM E-11 specifications for the number 18 sieve and are retained on a test sieve meeting ASTM E-11 specifications for the number 20 sieve. In one embodiment, the alpha alumina abrasive shards have a particle size such that most of the alpha alumina abrasive shards pass through an 18 mesh test sieve and can be retained on a 20, 25, 30, 35, 40, 45, or 50 mesh test sieve. In various embodiments of the invention, the alpha alumina abrasive shards can have a nominal screened grade comprising: −18+20, −20+25, −25+30, −30+35, −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635.

In one aspect, the present disclosure provides a plurality of abrasive particles having an abrasives industry specified nominal grade or nominal screened grade, wherein at least a portion of the plurality of abrasive particles are alpha alumina abrasive shards. In another aspect, the disclosure provides a method comprises grading the alpha alumina abrasive shards made according to the present disclosure to provide a plurality of alpha alumina abrasive shards having an abrasives industry specified nominal grade or a nominal screened grade.

If desired, the alpha alumina abrasive shards having an abrasives industry specified nominal grade or a nominal screened grade can be mixed with other known abrasive particles. In some embodiments, at least 5, 10, 15, 20, 25, 30, 35, 40, 45, 50, 55, 60, 65, 70, 75, 80, 85, 90, 95, or even 100 percent by weight of the plurality of abrasive particles having an abrasives industry specified nominal grade or a nominal screened grade are alpha alumina abrasive shards made according to the present disclosure, based on the total weight of the plurality of abrasive particles.

The predetermined angle α can be varied to vary the performance of the abrasive shards or solid, intact shaped abrasive particles as disclosed in copending U.S. application Ser. No. 12/337,075 entitled Shaped Abrasive Particles With A Sloping Sidewall filed on Dec. 17, 2008. Additionally, the abrasive shards can have grooves on the first precisely formed surface 21 as disclosed in copending U.S. Provisional Application No. 61/138,268 entitled Shaped Abrasive Particles With Grooves filed on Dec. 17, 2008. The grooves are formed by a plurality of ridges in the bottom surface 30 of the mold 34 that have been found to make it easier to remove precursor abrasive particles from the mold.

Method of Making Alpha Alumina Abrasive Shards

The first process step involves providing either a seeded or un-seeded abrasive dispersion containing particles that can be converted into alpha alumina. The particles are dispersed in a liquid that comprises a volatile component. In one embodiment, the volatile component is water. The abrasive dispersion should comprise a sufficient amount of liquid for the viscosity of the abrasive dispersion to be sufficiently low to enable filling the mold cavities and replicating the mold surfaces, but not so much liquid as to cause subsequent removal of the liquid from the mold cavity to be prohibitively expensive. The abrasive dispersion comprises from 2 percent to 90 percent by weight of the particles that can be converted into alpha alumina, such as particles of aluminum oxide monohydrate (boehmite), and at least 10 percent by weight, or from 50 percent to 70 percent, or 50 percent to 60 percent, by weight of the volatile component such as water. Conversely, the abrasive dispersion in some embodiments contains from 30 percent to 50 percent, or 40 percent to 50 percent, by weight solids.

Aluminum oxide hydrates other than boehmite can also be used. Boehmite can be prepared by known techniques or can be obtained commercially. Examples of commercially available boehmite include products having the trademarks "DISPERAL", and "DISPAL", both available from Sasol North America, Inc. or "HiQ-40" available from BASF Corporation. These aluminum oxide monohydrates are relatively pure, i.e., they include relatively little, if any, hydrate phases other than monohydrates, and have a high surface area. The physical properties of the resulting abrasive shards will generally depend upon the type of material used in the abrasive dispersion.

In one embodiment, the abrasive dispersion is in a gel state. As used herein, a "gel" is a three dimensional network of solids dispersed in a liquid. The abrasive dispersion may contain a modifying additive or precursor of a modifying additive. The modifying additive can function to enhance some desirable property of the abrasive shards or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the abrasive dispersion can be varied based on skill in the art. Typically, the introduction of a modifying additive or precursor of a modifying additive will cause the abrasive dispersion to gel. The abrasive dispersion can also be induced to gel by application of heat over a period of time.

The abrasive dispersion can also contain a nucleating agent to enhance the transformation of hydrated or calcined aluminum oxide to alpha alumina. Nucleating agents suitable for this disclosure include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating such abrasive dispersions is disclosed in U.S. Pat. No. 4,744,802 to Schwabel.

A peptizing agent can be added to the abrasive dispersion to produce a more stable hydrosol or colloidal abrasive dispersion. Suitable peptizing agents are monoprotic acids or acid compounds such as acetic acid, hydrochloric acid, formic acid, and nitric acid. Multiprotic acids can also be used but they can rapidly gel the abrasive dispersion, making it difficult to handle or to introduce additional components thereto. Some commercial sources of boehmite contain an acid titer (such as absorbed formic or nitric acid) that will assist in forming a stable abrasive dispersion.

The abrasive dispersion can be created or formed by any suitable means, such as, for example, simply by mixing aluminum oxide monohydrate with water containing a peptizing agent or by forming an aluminum oxide monohydrate slurry to which the peptizing agent is added. Defoamers or other suitable chemicals can be added to reduce the tendency to form bubbles or entrain air while mixing. Additional chemicals such as wetting agents, alcohols, or coupling agents can be added if desired. The alpha alumina abrasive grain may contain silica and iron oxide as disclosed in U.S. Pat. No. 5,645,619 to Erickson et al. on Jul. 8, 1997. The alpha alumina abrasive grain may contain zirconia as disclosed in U.S. Pat. No. 5,551,963 to Larmie on Sep. 3, 1996. Alternatively, the alpha alumina abrasive grain can have a microstructure or additives as disclosed in U.S. Pat. No. 6,277,161 to Castro on Aug. 21, 2001.

The second process step involves providing a mold 34 having at least one cavity 32, and preferably a plurality of cavities. Referring to FIGS. 1, and 2, the mold 34 has a generally planar bottom surface 30 and a plurality of cavities 32. The plurality of cavities can be formed in a production tool. The production tool can be a belt, a sheet, a continuous web, a coating roll such as a rotogravure roll, a sleeve mounted on a coating roll, or die. The production tool can be composed of metal, (e.g., nickel), metal alloys, or plastic. The metal production tool can be fabricated by any conventional technique such as, for example, engraving, bobbing, electroforming, or diamond turning. The production tool can comprise polymeric material. In one embodiment, the entire tooling is made from a polymeric or thermoplastic material. In another embodiment, the surfaces of the tooling in contact with the sol-gel while drying, such as the surfaces of the plurality of cavities (mold bottom surface and mold sidewall) comprises polymeric or thermoplastic materials and other portions of the tooling can be made from other materials. A suitable polymeric coating may be applied to a metal tooling to change its surface tension properties by way of example.

A polymeric tool can be replicated off a metal master tool. The master tool will have the inverse pattern desired for the production tool. The master tool can be made in the same manner as the production tool. In one embodiment, the master tool is made out of metal, e.g., nickel and is diamond turned. The polymeric sheet material can be heated along with the master tool such that the polymeric material is embossed with the master tool pattern by pressing the two together. The polymeric material can also be extruded or cast onto the master tool and then pressed. The polymeric material is cooled to solidify and produce the production tool. Examples of polymeric production tool materials include thermoplastics such as polyester, polycarbonates, polyvinyl chloride, polypropylene, polyethylene and combinations thereof, as well as thermosetting materials. If a thermoplastic production tool is utilized, then care should be taken not to generate excessive heat that may distort the thermoplastic production tool limiting its life. More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Access to cavities 32 can be from an opening in the top surface 38, from an opening (not shown) in the bottom surface 30, or from openings in both surfaces of the mold 34. In some instances, the cavity 32 can extend for the entire thickness of mold 34. Alternatively, the cavity 32 can extend only for a portion of the thickness of the mold 34. In one embodiment, the top surface 38 is substantially parallel to bottom surface 30 of the mold 34 with the cavities having a substantially uniform depth. At least one side of the mold 34, i.e. the side in which the cavity is formed, can remain exposed to the surrounding atmosphere during the step in which the volatile component is removed.

The cavity 32 has a specified three-dimensional shape. In one embodiment, the shape of a cavity can be described as being a triangle, as viewed from the top, having a sloping sidewall 36 such that the bottom surface 30 of the cavity is slightly smaller than the opening in the top surface 38. A sloping sidewall is believed to enable easier removal of the precursor abrasive particles from the mold. In various embodiments of the disclosure, the predetermined angle α can be between about 91 degrees to about 120 degrees, or between about 95 degrees to about 100 degrees such as 98 degrees. In other embodiments, the predetermined angle α can be between about 95 degrees to about 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees as disclosed in copending patent application Ser. No. 12/337,075 referred to above. In another embodiment, the mold 34 comprised a plurality of triangular cavities. Each of the plurality of triangular cavities comprises an equilateral triangle.

Alternatively, other cavity shapes can be used, such as, circles, rectangles, squares, hexagons, stars, or combinations thereof, all having a substantially uniform depth dimension. The depth dimension is equal to the perpendicular distance from the top surface 38 to the lowermost point on the bottom surface 30. In addition, a cavity can have the inverse of other geometric shapes, such as, for example, pyramidal, frusto-pyramidal, truncated spherical, truncated spheroidal, conical, and frusto-conical. The depth of a given cavity can be uniform or can vary along its length and/or width. The cavities of a given mold can be of the same shape or of different shapes.

The third process step involves filling the cavities in the mold with the abrasive dispersion by any conventional technique. In some embodiments, a knife roll coater or vacuum slot die coater can be used. In one embodiment, the top surface 38 of the mold 34 is coated with the abrasive dispersion. The abrasive dispersion can be pumped onto top surface 38. Next, a scraper or leveler bar can be used to force the abrasive dispersion fully into the cavity 32 of the mold 34. The remaining portion of the abrasive dispersion that does not enter cavity 32 can be removed from top surface 38 of the mold 34 and recycled. In some embodiments, a knife roll coater can be used. In some embodiments, a small portion of the abrasive dispersion can remain on top surface 38 and in other embodiments the top surface is substantially free of the dispersion. The pressure applied by the scraper or leveler bar is typically less than 100 psi, or less than 50 psi, or less than 10 psi. In some embodiments, no exposed surface of the abrasive dispersion extends substantially beyond the top surface 38 to ensure uniformity in thickness of the resulting abrasive particles.

In one embodiment, the internal surfaces of the cavity including the sidewall 36 and the bottom surface 30 are free of mold release agents. Typical mold release agents include, for example, oils such as peanut oil, fish oil, or mineral oil, silicones, polytetrafluoroethylene, zinc sterate, and graphite. Absence of a mold release agent helps to ensure that the precursor abrasive particles will stick to the cavity walls as the abrasive dispersion is dried thereby cracking at least the majority of the precursor abrasive particles in the mold.

The fourth process step involves intentionally fracturing the precursor abrasive particles into at least two pieces while residing within the mold by removing a portion of the liquid, i.e. the volatile component thereof from the abrasive dispersion. Desirably, the volatile component is removed by rapid evaporation. A sufficient amount of the volatile component must be rapidly removed from the abrasive dispersion to bring rapid solidification thereof, thereby forming a plurality of precursor abrasive particles that are fractured into at least two pieces. The plurality of fractured precursor abrasive particles have approximately the same shape as the shape of the mold cavity, but are fractured into two or more pieces. Typically, up to 40 percent of the liquid is removed from the abrasive dispersion in this step.

In some embodiments, removal of the volatile component by evaporation occurs at temperatures above the boiling point of the volatile component. An upper limit to the drying temperature often depends on the material the mold is made from. For polypropylene tooling the temperature should be less than the melting point of the plastic. Metal tooling can be heated to significantly higher temperatures than plastic tooling. The drying temperature to fracture at least a majority of the precursor abrasive particles into at least two or more pieces is also dependent on the solids content of the abrasive dispersion and the volatile component in the dispersion.

In one embodiment, for a water dispersion of between about 40 to 50 percent solids and a polypropylene mold, the drying temperatures can be from about 90 degrees C. to about 165 degrees C., or between about 105 degrees C. to about 150 degrees C., or between about 105 degrees C. to about 120 degrees C. Higher temperatures can fracture the precursor abrasive particles faster but can also lead to degradation of the polypropylene tooling limiting its useful life as a mold.

Alternatively or in combination with the rapid evaporation, mechanical apparatus can be used to fracture the precursor abrasive particles into at least two pieces while residing in the cavities in the mold. For example, a pair of nipped rolls can be used to apply a normal force to the mold to deflect and crack the precursor abrasive particles. The nipped rolls could include a knurled or embossed roll that is loaded against the top surface 38 and an elastomeric roll that can be loaded against the bottom surface of the mold as the mold traverses the through the nip. It is also possible to flex or sharply bend the mold to crack and fracture the precursor abrasive particles while residing in the mold.

Referring specifically to FIG. 2, a mold comprising a plurality of cavities 32 is shown. Contained within the cavities of the mold is a plurality of precursor abrasive particles 23. The mold is formed from polypropylene material. Each of the cavities comprises an equilateral triangle with each leg of the triangle having a length of approximately 0.110 inch (2.8 mm) (when measured at the top surface 38 (FIG. 1). Each cavity 32 was designed such that the sidewall 36 intersected with the bottom surface 30 at a predetermined angle $\alpha$ of approximately 98 degree. Each cavity 32 had an approximate depth of 0.028 inch (0.7112 mm) when measured perpendicularly from the bottom surface 30 to the top surface 38.

Each cavity 32 in the left-hand side of the mold was coated with a thin layer of 0.1% peanut oil in methyl alcohol, which acted as a release agent. Each cavity in the right-hand side of the mold was left untreated and was free of any release agents. The polypropylene production tooling treated with 0.1% peanut oil in methyl alcohol had a surface energy of approximately 35 dynes/cm, which resulted in few fractured, precursor abrasive particles. The untreated tooling without using any mold release agent had a wetting tension of approximately 32 dynes/cm, which resulted in fracturing almost all of the precursor abrasive particles. Desirably, the wetting tension of the contacting surface of the production tool is less than about 33 dynes/cm. Wetting tension can be measured using wetting tension test solutions made by Enercon Industries Corporation. The test solutions are applied using cotton swabs to spread the solutions onto the production tooling in accordance with ASTM D2578-04a "Standard Test Method for Wetting Tension of Polyethylene and Polypropylene Films."

After filling each cavity with an abrasive dispersion, the mold was placed into an oven and heated at a temperature of approximately 110 degrees C. for a period of 45 minutes. Approximately 99.7% of the precursor abrasive particles by weight in the right-hand side of the mold in FIG. 2 were fractured into approximately 2 to 4 pieces thereby producing a plurality of fractured precursor abrasive particles within each mold cavity. The precursor abrasive particles in the mold were run across an ultrasonic horn to remove them from the mold. The resulting abrasive shards after firing were screened to a −35+40 sieve fraction and then photographed as shown in FIG. 4. In contrast, the left-hand side of the mold in FIG. 2 when treated with the peanut oil release agent and dried under identical conditions had approximately 18% by weight of the fractured abrasive particles.

The fifth process step involves removing the fractured plurality of precursor abrasive particles from the mold cavities. This step is made easier by shrinkage of the abrasive dispersion during formation of the precursor abrasive particles when the liquid is removed. For example, it is not uncommon for the volume of the precursor abrasive particles to be 80 percent or less of that of the abrasive dispersion from which it was formed. The fractured plurality of precursor abrasive particles can be removed from the cavities by using the following processes alone or in combination on the mold: gravity, vibration, ultrasonic vibration, vacuum, or pressurized air to remove the particles from the mold. The fractured precursor abrasive particles once removed from the cavities could be reassembled like jig saw puzzle pieces to have approximately the same shape as the cavities of the mold from which they were formed.

The fractured precursor abrasive particles can be further dried outside of the mold. If the abrasive dispersion is dried to the desired level in the mold, this additional drying step is not necessary. However, in some instances it may be economical to employ this additional drying step to minimize the time that the abrasive dispersion resides in the mold. Typically, the precursor abrasive particles will be dried from 10 to 480 minutes, or from 120 to 400 minutes, at a temperature from 50 degrees C. to 160 degrees C., or at 120 degrees C. to 150 degrees C.

The sixth process step involves calcining the fractured plurality of precursor abrasive particles. During calcining, essentially all the volatile material is removed, and the various components that were present in the abrasive dispersion are transformed into metal oxides. The fractured precursor abrasive particles are generally heated to a temperature of from 400 degrees C. to 800 degrees C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, fractured precursor abrasive particles. Then the fractured plurality of precursor abrasive particles are prefixed again. This option is further described in European Patent Application No. 293,163.

The seventh process step involves sintering the calcined, fractured plurality of precursor abrasive particles to form the abrasive shards 21. Prior to sintering, the calcined, fractured plurality of precursor abrasive particles are not completely densified and thus lack the hardness to be used as abrasive particles. Sintering takes place by heating the calcined, fractured precursor abrasive particles to a temperature of from 1,000 degrees C. to 1,650 degrees C. and maintaining them within this temperature range until substantially all of the alpha alumina monohydrate (or equivalent) is converted to alpha alumina and the porosity is reduced to less than 15 percent by volume. The length of time to which the calcined, fractured precursor abrasive particles must be exposed to the sintering temperature to achieve this level of conversion depends upon various factors but usually from five seconds to 48 hours is typical. In another embodiment, the duration for the sintering step ranges from one minute to 90 minutes. Once sintered, the calcined, fractured plurality of precursor abrasive particles are converted into a plurality of alpha alumina abrasive shards. After sintering, the abrasive shards can have a Vickers hardness of 10 GPa, 16 GPa, 18 GPa, 20 GPa, or greater.

Other steps can be used to modify the described process, such as rapidly heating the material from the calcining temperature to the sintering temperature, centrifuging the abrasive dispersion to remove sludge, waste, etc. Moreover, the process can be modified by combining two or more of the process steps if desired. Conventional process steps that can be used to modify the process of this disclosure are more fully described in U.S. Pat. No. 4,314,827 to Leitheiser.

Abrasive Article

In another aspect, the present disclosure provides an abrasive article comprising a binder and a plurality of abrasive particles, wherein at least a portion of the abrasive particles are alpha alumina abrasive shards made according to the present disclosure. Exemplary abrasive articles include coated abrasive articles, bonded abrasive articles (e.g., wheels), nonwoven abrasive articles, and abrasive brushes. Coated abrasive articles typically comprise a backing having first and second, opposed major surfaces and wherein the binder (make coat) and the plurality of abrasive particles form an abrasive layer on at least a portion of the first major surface. In some embodiments, at least 5, 10, 15, 20, 25, 30, 35, 40, 45, 50, 55, 60, 65, 70, 75, 80, 85, 90, 95, or even 100 percent by weight of the abrasive particles in an abrasive article are alpha alumina abrasive shards made according to the present disclosure based on the total weight of the abrasive particles in the abrasive article.

Figure 6:
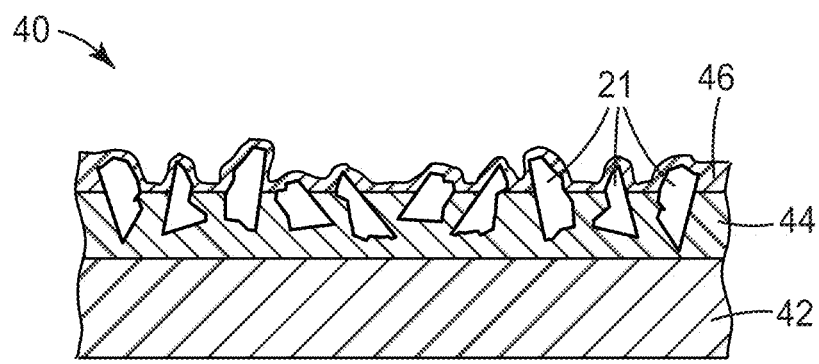
FIG. 6 illustrates a cross section of an abrasive article made from the abrasive shards of FIG. 4.

Referring to FIG. 6, a coated abrasive article 40 comprises a backing 42 having a first layer of a make coat 44 (binder) applied over a first major surface of the backing 42. Partially embedded in the make coat 44 are a plurality of alpha alumina abrasive shards 21 forming an abrasive layer. Over the abrasive shards 21 is a second layer of a size coat 46. The purpose of the make coat 44 is to secure the abrasive shards 21 to the backing 42 and the purpose of the size coat 46 is to reinforce the abrasive shards 21. In some embodiments, at least 5, 10, 15, 20, 25, 30, 35, 40, 45, 50, 55, 60, 65, 70, 75, 80, 85, 90, 95, or even 100 percent by weight of the abrasive particles in the abrasive layer are alpha alumina abrasive shards made according to the present disclosure based on the total weight of the abrasive particles within the abrasive layer. In some embodiments, between about 60 percent to 100 percent by weight of the abrasive particles in the abrasive layer are alpha alumina abrasive shards. In another embodiment, about 100 percent by weight of the abrasive particles in the abrasive layer are alpha alumina abrasive shards.

During the manufacture of the coated abrasive article, the alpha alumina abrasive shards can be applied into the make coat by electrostatic coating techniques. Electrostatic coating causes the higher aspect ratio alpha alumina abrasive shards to be orientated substantially vertically. This manner of orientation results in improved performance of the coated abrasive article.

The abrasive article may contain a blend of the alpha alumina abrasive shards along with conventional abrasive grains, diluent grains, or erodable agglomerates, such as those described in U.S. Pat. Nos. 4,799,939 and 5,078,753. Representative examples of conventional abrasive grains include fused aluminum oxide, silicon carbide, garnet, fused alumina zirconia, cubic boron nitride, diamond, and the like. Representative examples of diluent grains include marble, gypsum, and glass.

The alpha alumina abrasive shards may also have a surface coating. Surface coatings are known to improve the adhesion between abrasive grains and the binder in abrasive articles or can be used to aid in electrostatic deposition of the abrasive shards. Such surface coatings are described in U.S. Pat. Nos. 5,213,591, 5,011,508; 1,910,444; 3,041,156; 5,009,675; 5,085,671; 4,997,461 and 5,042,991. Additionally, the surface coating may prevent the abrasive shards from capping. Capping is the term to describe the phenomenon where metal particles from the workpiece being abraded become welded to the tops of the abrasive particles. Surface coatings to perform the above functions are known to those of skill in the art.

The make coat and size coat comprise a resinous adhesive. The resinous adhesive of the make coat can be the same as or different from that of the size coat. Examples of resinous adhesives that are suitable for these coats include phenolic resins, epoxy resins, urea-formaldehyde resins, acrylate resins, aminoplast resins, melamine resins, acrylated epoxy resins, urethane resins and combinations thereof.

In addition to the resinous adhesive, the make coat or size coat, or both coats, may further comprise additives that are known in the art, such as, for example, fillers, grinding aids, wetting agents, surfactants, dyes, pigments, coupling agents, and combinations thereof. Examples of fillers include calcium carbonate, silica, talc, clay, calcium metasilicate, dolomite, aluminum sulfate and combinations thereof. Grinding aids encompass a wide variety of different materials and can be inorganic or organic. Examples of grinding aids include waxes, organic halide compounds, halide salts, and metals and their alloys. The organic halide compounds will typically break down during abrading and release a halogen acid or a gaseous halide compound. It is also within the scope of this disclosure to utilize a supersize coating. The supersize coating typically contains a binder and a grinding aid. The binders can be formed from such materials as phenolic resins, acrylate resins, epoxy resins, urea-formaldehyde resins, melamine resins, urethane resins, and combinations thereof.

EXAMPLES

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples and the rest of the specification are by weight.

A boehmite gel was made by the following procedure: aluminum oxide monohydrate powder (1,235 parts) having the trade designation "DISPERAL" was dispersed by continuous mixing in a solution containing water (3,026 parts) and 70% aqueous nitric acid (71 parts). The sol that resulted was then heated to a temperature of approximately 125° C. in a continuous dryer to produce a 44% solids dispersion. The sol-gel was forced into production tooling having triangular shaped cavity sizes and dimensions of 28 mils depth and 110 mils on each side. The draft angel $\alpha$ between the sidewall and bottom surface of the mold was 98 degrees. The production tooling was manufactured to have 50% of the mold cavities with 8 parallel ridges rising from the bottom surfaces of the cavities that intersected with one side of the triangle at a 90 degree angle and the remaining cavities had a smooth bottom mold surface. The parallel ridges were spaced every 0.277 mm and the cross section of the ridges was a triangle shape having a height of 0.0127 mm and a 45 degree angle between the sides of each ridge at the tip as described in copending patent application 61/138,268 referred to above. The sol-gel was forced into the cavities with a putty knife until all openings of the tooling were completely filled. No mold release was used on the production tooling and the sol-gel coated production tooling was placed in a convection air oven set at 110 degrees C. and dried for 40 minutes to fracture the precursor abrasive particles while residing in the cavities of the production tooling. The fractured, precursor abrasive particles were removed from the production tooling by passing it over an ultrasonic horn. The fractured precursor abrasive particles were calcined at approximately 650 degrees C. and then saturated with a mixed nitrate solution of the following concentration (reported as oxides): 1.8% each of MgO, $Y_2O_3$, $Nd_2O_3$ and $La_2O_3$. The excess nitrate solution was removed and the saturated fractured precursor abrasive particles were allowed to dry after which the particles were again calcined at 650 degrees C. and sintered at approximately 1400 degrees C. Both the calcining and sintering was performed using rotary tube kiln. Typical alpha alumina abrasive shards produced by the above method are shown in FIG. 4.

Samples of intact alpha alumina triangular particles (intact triangles) were prepared in a similar fashion as described above except, in this case, a release agent consisting of 0.1% peanut oil in methyl alcohol was sprayed onto the production tooling prior to filling. Typical alpha alumina abrasive triangles produced by the method are shown in FIG. 3.

Samples of alpha alumina triangular particles produced by the method disclosed in U.S. Pat. No. 5,366,523 to Rowenhorst were also evaluated. The abrasive triangular particles produced by Rowenhorst (Rowenhorst triangles) tend to have rounded corners and less precise surfaces as best seen in FIG. 4 of the '523 patent. As seen, the abrasive triangular particles do not have straight edges or sharp corners as a result of the molding techniques and drying methods.

The intact triangles, Rowenhorst triangles and abrasive shards were graded through USA Standard Testing Sieves to obtain a nominal screened grade of the abrasive particles. The intact triangles and Rowenhorst triangles were graded through a −18+20 mesh sieves to remove any defective particles. The produced alpha alumina abrasive shards included larger more triangular shaped shards and smaller shards resembling long, thin slivers. Alpha alumina abrasive shards of −20+25, −25+30, and −30+35 mesh sieves were coated onto fiber disc backings using a standard calcium carbonate-filled phenolic make resin and cryolite-filled phenolic size resin. After sufficient cure of the phenolic resin, the discs were evaluated using the Grinding Test. Control discs used standard, random crushed 321 CUBITRON alpha alumina abrasive grains available from 3M Corporation, St. Paul, Minn. that were graded to the same sieve sizes as the alpha alumina abrasive shards in the experimental discs. The control discs were prepared at the same time and in the same manor as the experimental discs. Disks having the intact triangles and Rowenhorst triangles abrasive triangles shown in FIG. 4 of the patent were also prepared in the same manner. All of the disks were evaluated using the Grinding Test.

Grinding Test

The abrasive discs were tested using the following procedure. 7-inch (17.8 cm) diameter abrasive discs for evaluation were attached to a rotary grinder fitted with a 7-inch (17.8 cm) ribbed disc pad face plate ("80514 Extra Hard Red" obtained from 3M Company, St. Paul, Minn.). The grinder was then activated and urged against an end face of a 0.75×0.75 in (1.9×1.9 cm) pre-weighed 1045 steel bar under a load of 10 lb (4.5 kg). The resulting rotational speed of the grinder under this load and against this workpiece was 5000 rpm. The workpiece was abraded under these conditions for a total of thirty six (36) 20-second grinding intervals (passes). Following each 20-second interval, the workpiece was allowed to cool to room temperature and weighed to determine the cut of the abrasive operation. Test results were reported as the incremental cut for each interval and the total cut removed. If desired, the testing can be automated using suitable equipment.

Figure 7:
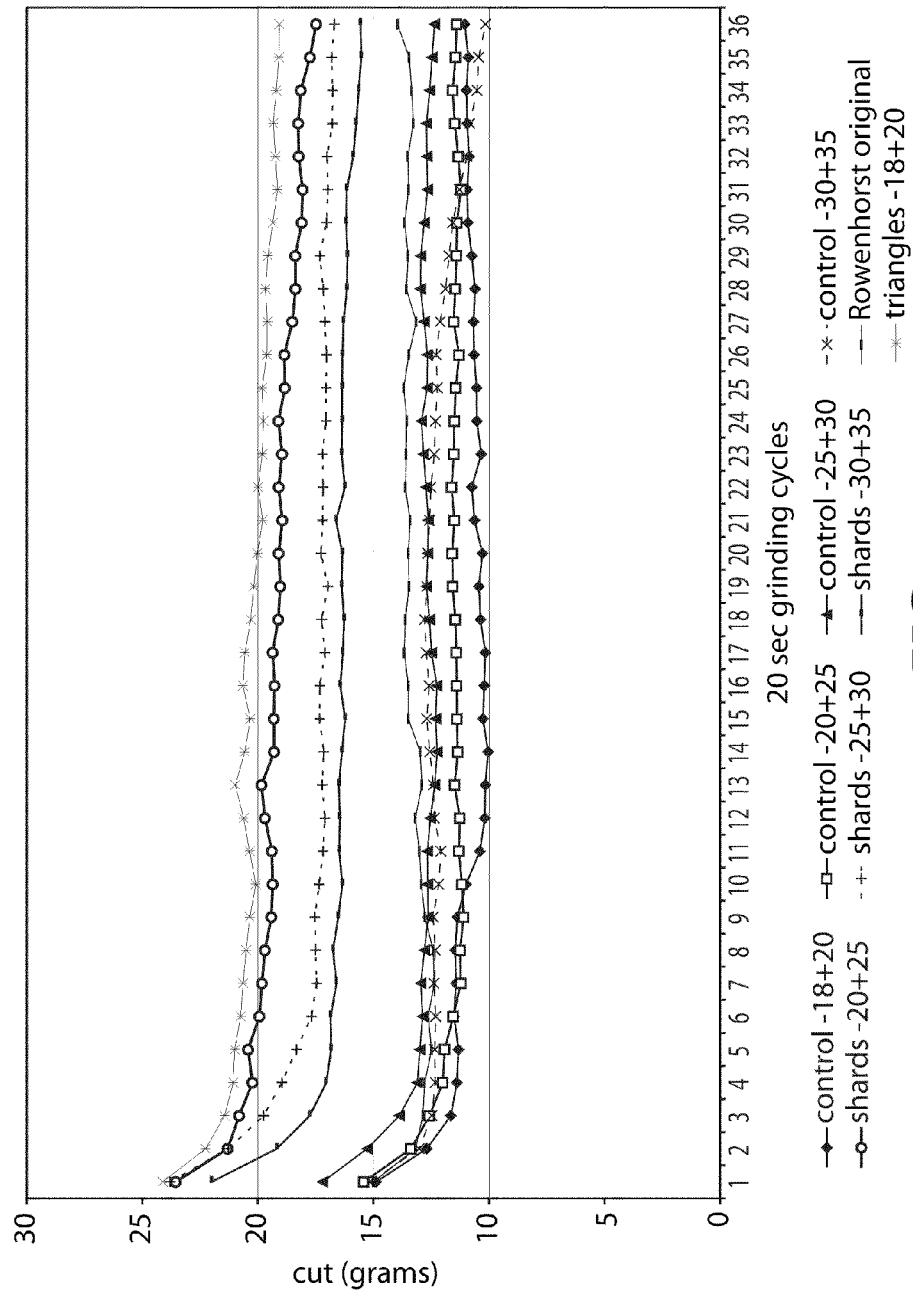
FIG. 7 illustrates a graph of cut in grams of metal removed versus test cycle for several test samples.

FIG. 7 plots the incremental cut in grams at each interval for each sample. Table 1 presents the total cut in grams that was removed during the test. As seen, the alpha alumina abrasive shards at each nominal screened fraction out performed the randomly crushed alpha alumina abrasive grain and the Rowenhorst triangles. Surprisingly, the abrasive shards from the nominal screened grade −20+25 having a smaller particle size performed similarly to the −18+20 intact triangles and much better than the −18+20 Rowenhorst triangles. Thus, the relative sharpness of the alpha alumina abrasive shards is significantly improved over the Rowenhorst triangles.

TABLE 1

Total Cut

| Abrasive Particle | Particle Size | Total Cut (g) |
|---|---|---|
| 321 CUBITRON | −18 + 20 | 393.1 |
| Intact Triangles | −18 + 20 | 728.9 |
| Rowenhorst Triangles | −18 + 20 | 478.9 |
| 321 CUBITRON | −20 + 25 | 418.9 |
| Abrasive Shards | −20 + 25 | 693.0 |
| 321 CUBITRON | −25 + 30 | 464.5 |
| Abrasive Shards | −25 + 30 | 633.8 |
| 321 CUBITRON | −30 + 35 | 438.2 |
| Abrasive Shards | −30 + 35 | 597.1 |

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An abrasive comprising: a plurality of alpha alumina abrasive shards having an abrasives industry specified nominal grade or a nominal screened grade, the plurality of alpha alumina abrasive shards comprising a first precisely formed surface, a second precisely formed surface intersecting with the first precisely formed surface at a molded angle α, a third surface opposite the first precisely formed surface, and a fractured surface that propagates between the first precisely formed surface and the opposing third surface.

2. The abrasive of claim 1 comprising an abrasive industry specified nominal grade selected from the group consisting of ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600.

3. The abrasive of claim 1 wherein the nominal screened grade is selected from the group consisting of −18+20, −20+25, −25+30, −30+35, −35+40, −40+45, −45+50, and −50+60.

4. The abrasive of claim 1 comprising a binder forming an abrasive article selected from the group consisting of bonded abrasive articles, coated abrasive articles, nonwoven abrasive articles, and abrasive brushes.

5. The abrasive of claim 4 wherein the plurality of alpha alumina abrasive shards are formed in a mold having a plurality of triangular cavities.

6. The abrasive of claim 5 wherein the plurality of triangular cavities each comprise an equilateral triangle.

7. The abrasive article of claim 5 wherein 2 to 4 alpha alumina abrasive shards are formed in each of the plurality of triangular cavities.

8. The abrasive of claim 1 comprising a make coat on a first major surface of a backing and the plurality of alpha alumina abrasive shards partially embedded in the make coat forming an abrasive layer, the abrasive layer coated with a size coat, and wherein the abrasive layer comprises at least 5 percent by weight of the plurality of alpha alumina abrasive shards.

9. The abrasive of claim 8 wherein the abrasive layer comprises between about 60 to 100 percent by weight of the plurality of alpha alumina abrasive shards.

10. The abrasive of claim 8 wherein the abrasive layer comprises about 100 percent by weight of the plurality of alpha alumina abrasive shards.

11. The abrasive of claim 8 wherein the plurality of alpha alumina abrasive shards formed in a mold having a plurality of triangular cavities.

12. The abrasive of claim 11 wherein each of the plurality of triangular cavities comprises an equilateral triangle.

13. The abrasive of claim 8 wherein the plurality of alpha alumina abrasive shards comprise an abrasive industry specified nominal grade selected from the group consisting of ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600.

14. The abrasive of claim 13 wherein the abrasive layer comprises between about 60 to 100 percent by weight of the plurality of alpha alumina abrasive shards.

15. The abrasive of claim 13 wherein the abrasive layer comprises about 100 percent by weight of the plurality of alpha alumina abrasive shards.

16. The abrasive of claim 1 wherein the molded angle α is between about 91 degrees to about 120 degrees.

17. The abrasive of claim 16 wherein the molded angle α is between about 95 degrees to about 100 degrees.

18. The abrasive of claim 1 wherein the plurality of alpha alumina abrasive shards comprise a Vickers hardness of 10 GPa or greater.

* * * * *